No. 740,393.  
PATENTED OCT. 6, 1903.
H. CALDWELL.  
SAW SET.  
APPLICATION FILED DEC. 1, 1902.
NO MODEL.
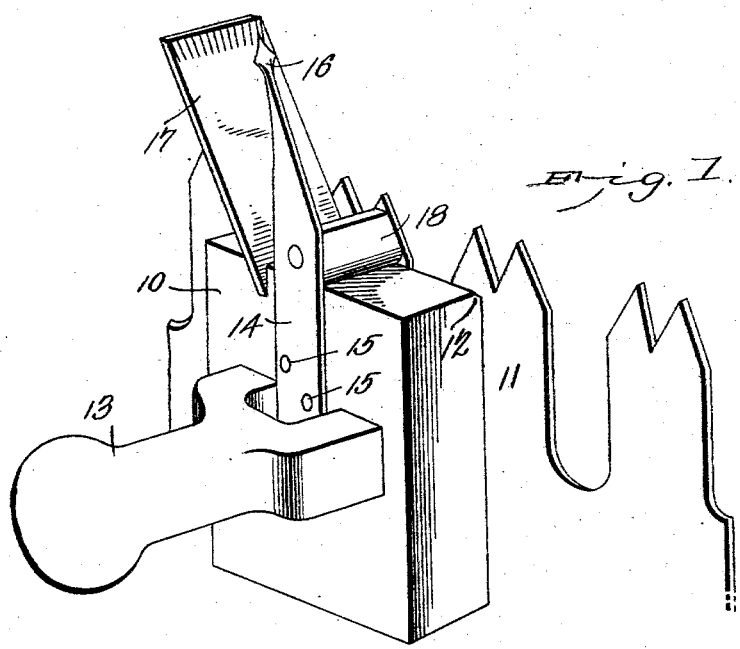
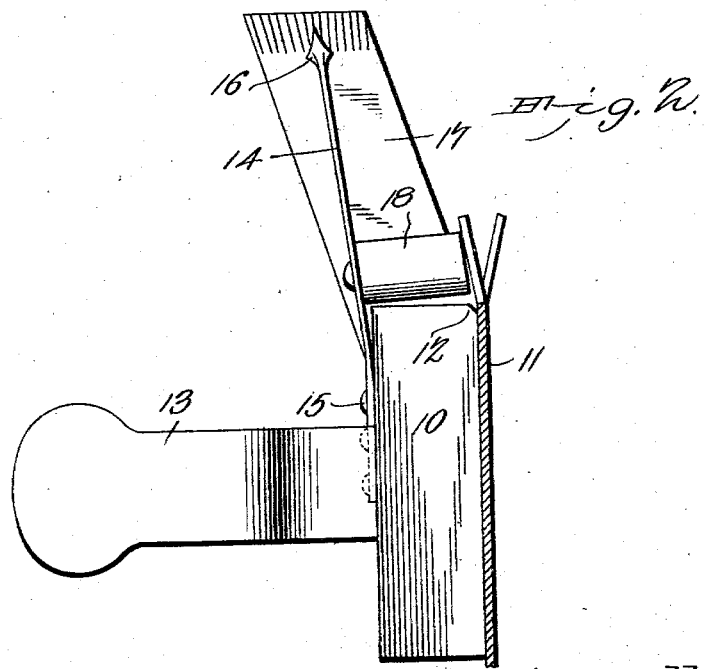

No. 740,393. Patented October 6, 1903.

UNITED STATES PATENT OFFICE.

HENRY CALDWELL, OF OCOSTA, WASHINGTON.

SAW-SET.

SPECIFICATION forming part of Letters Patent No. 740,393, dated October 6, 1903.

Application filed December 1, 1902. Serial No. 133,412. (No model.)

*To all whom it may concern:*

Be it known that I, HENRY CALDWELL, a citizen of the United States, residing at Ocosta, in the county of Chehalis and State of Washington, have invented a new and useful Saw-Set, of which the following is a specification.

This invention relates to devices employed in setting and gaging saw-teeth, and has for its object the production of a simply-constructed and easily applied and operated device whereby the teeth may be readily set to any desired angle and the degree of angularity accurately indicated; and the invention consists in an anvil having a graduated scale and a movable pointer positioned relative to the scale and the teeth of the saw whereby the saw-teeth will engage the pointer and cause it to indicate upon the scale the degree of angularity of the teeth.

The invention further consists in certain novel features of the construction, as hereinafter shown and described, and specified in the claims.

In the drawings illustrative of the invention, in which corresponding parts are indicated by like designating characters, Figure 1 is a perspective view of the device applied. Fig. 2 is a side elevation with the saw in transverse section.

The improved device consists in an anvil 10 of any approved form, but preferably rectangular, as shown, with the upper edge next the saw (indicated at 11) slightly inclined outwardly, as shown at 12. The anvil will be provided with a handle member 13, the handle member preferably forked next the anvil to provide for the lower end of a spring-arm 14, the latter secured to the anvil by rivets or screws 15 at a sufficient distance below the top of the anvil to permit the arm to be sprung outwardly away from the anvil, as indicated in Fig. 2. The free end of the arm 14 terminates in a pointer 16, adapted to move across a graduated plate 17, extending from the anvil, as shown. Attached to the arm 14 is a stop 18, extended to a point in substantial alinement with the face of the anvil, as shown in Fig. 1. When thus constructed, the operation of the device is as follows: The saw 11 will be firmly supported in a suitable holding mechanism, (not shown, as it forms no part of the present invention,) and the anvil-block 10 held against the face of the saw, with the stop 18 in the rear of the tooth which is to be set. The anvil-block is firmly held against the saw-blade and the tooth to be set struck by a hammer in the ordinary manner and bent laterally to secure the proper "set." As the tooth is bent laterally it engages the stop 18 and forces the pointer 14 away from the anvil, with the end 16 adjacent to the graduations on the plate 17, the graduations thus indicating the degree of angularity of the set, as illustrated in Fig. 2. By this very simple means the set of the teeth may be very accurately ascertained and the teeth set with great regularity and uniformity, as each tooth will thus be gaged consecutively and any variation immediately detected so that it may be corrected.

The device is extremely simple and easy of application and enables persons not previously skilled to perfectly and accurately set and gage saws of various kinds and with various shapes and sizes of teeth, as the same device may be employed for a great variety and sizes of teeth.

The anvil may be modified as to size, if required, to adapt the device to different sizes of saw-teeth and to teeth of different forms. The pointer 14 and its stop 18, as well as the graduated plate 17, may be modified and changed as to shape and size to adapt the device to different forms and sizes of saws, and I do not wish to be limited, therefore, to any specific size, proportions, or weight of the different parts.

The parts will preferably be formed of steel, the anvil-block being properly tempered to withstand the impact of the blows imparted to the teeth in setting them, and the other parts will likewise be preferably of steel and of sufficient size to withstand the strains to which they will be subjected.

Having thus described the invention, what is claimed is—

1. In a combined saw set and gage, the combination of an anvil, a graduated scale, a spring-arm rigidly fastened to said anvil and terminating in a pointer movable over said scale, and means whereby the teeth of the saw will cause said spring-arm to indicate the set of the teeth by its pointer on the scale, substantially as described.

2. In a combined saw set and gage, the combination of an anvil, a graduated scale, a pointer movable over said scale, and a stop extending from said pointer and terminating adjacent to the face of the anvil, whereby the teeth of the saw will cause said pointer to indicate the set of the teeth, substantially as described.

3. The combination in a combined saw set and gage of an anvil having a spring-arm rigidly fastened on the back thereof and terminating in a pointer, a scale-plate disposed perpendicular to the face of said anvil and extending upward from the top of said anvil and backward from the face, and a stop carried by said spring and extending forward and terminating adjacent to the face of said anvil.

In testimony that I claim the foregoing as my own I have hereto affixed my signature in the presence of two witnesses.

HENRY CALDWELL.

Witnesses:
C. B. COGHLAN,
EVA M. DEMING.